(12) United States Patent
Kattainen et al.

(10) Patent No.: US 11,097,922 B2
(45) Date of Patent: Aug. 24, 2021

(54) CURRENT CUT-OFF ARRANGEMENT OF AN ELEVATOR

(71) Applicant: KONE Corporation, Helsinki (FI)

(72) Inventors: Ari Kattainen, Helsinki (FI); Juha-Matti Aitamurto, Helsinki (FI); Juhamatti Nikander, Helsinki (FI); Arto Nakari, Helsinki (FI)

(73) Assignee: KONE CORPORATION, Helsinki (FI)

( * ) Notice: Subject to any disclaimer, the term of this patent is extended or adjusted under 35 U.S.C. 154(b) by 737 days.

(21) Appl. No.: 15/969,527

(22) Filed: May 2, 2018

(65) Prior Publication Data

US 2018/0327215 A1    Nov. 15, 2018

(30) Foreign Application Priority Data

May 15, 2017 (EP) ..................... 17171038

(51) Int. Cl.
| | | |
|---|---|---|
| *B66B 1/30* | (2006.01) | |
| *B66B 1/32* | (2006.01) | |
| *B66B 5/02* | (2006.01) | |
| *G05B 9/02* | (2006.01) | |
| *B66B 1/34* | (2006.01) | |
| *B66B 13/22* | (2006.01) | |

(52) U.S. Cl.
CPC ............. *B66B 1/308* (2013.01); *B66B 1/32* (2013.01); *B66B 1/3423* (2013.01); *B66B 5/02* (2013.01); *B66B 13/22* (2013.01); *G05B 9/02* (2013.01); *B66B 2201/00* (2013.01)

(58) Field of Classification Search
CPC .......... B66B 1/308; B66B 13/22; B66B 1/32; B66B 5/02; B66B 1/3423; B66B 2201/00; B66B 1/00; B66B 5/0031; B66B 11/04; G05B 9/02

See application file for complete search history.

(56) References Cited

U.S. PATENT DOCUMENTS

| | | | | |
|---|---|---|---|---|
| 4,506,766 A | * | 3/1985 | Watanabe | B66B 5/027 187/290 |
| 2010/0032246 A1 | * | 2/2010 | Kattainen | B66B 1/30 187/305 |
| 2011/0278099 A1 | * | 11/2011 | Kattainen | B66B 5/02 187/288 |
| 2013/0146398 A1 | | 6/2013 | De Coi et al. | |
| 2015/0053507 A1 | | 2/2015 | Kattainen et al. | |
| 2016/0311653 A1 | | 10/2016 | Müller et al. | |

* cited by examiner

*Primary Examiner* — Jeffrey Donels
(74) *Attorney, Agent, or Firm* — Birch, Stewart, Kolasch & Birch, LLP.

(57) ABSTRACT

The arrangement comprises a drive driving an electric motor, a contactor and a control circuit connecting a control coil of the contactor to a power supply. The control circuit comprises a manual control part provided with a manually operated first switch, and an electronical control part provided with an electronically operated second switch and a processor controlling the second switch. The first switch and the second switch are connected in series in the control circuit with the power supply and the control coil of the contactor so that de-energization of the control coil of the contactor may be done either by the first switch or by the second switch.

19 Claims, 2 Drawing Sheets

CURRENT CUT-OFF ARRANGEMENT OF AN ELEVATOR

FIELD

Figure 1:
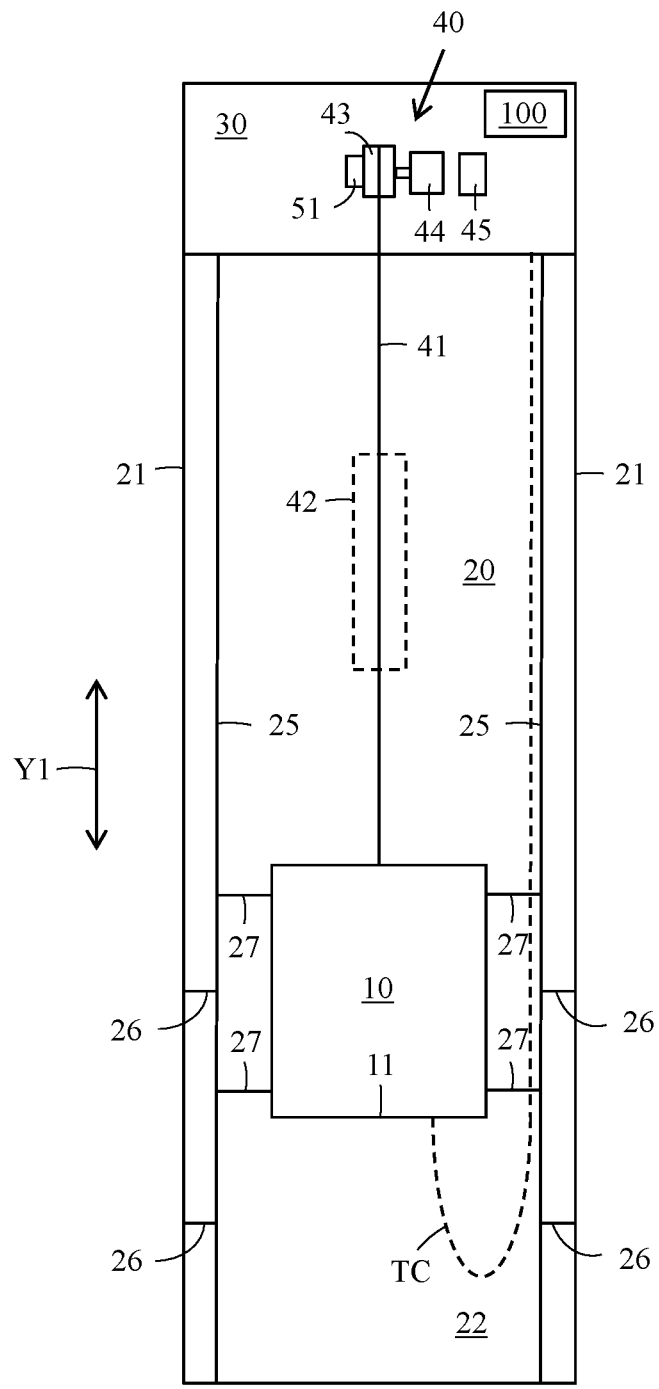

The invention relates to a current cut-off arrangement of an elevator.

BACKGROUND

An elevator comprises typically a car, an elevator shaft, a machine room, lifting machinery, ropes, and a counter weight. The elevator car is positioned within a car frame that supports the car. The lifting machinery may comprise a sheave, a machinery brake, an electric motor, and a drive for the electric motor. The lifting machinery may move the car in a vertical direction upwards and downwards in the vertically extending shaft. The ropes may connect the car frame and thereby also the car via the sheave to the counter weight. The car frame may further be supported with gliding means on guide rails extending in the vertical direction in the shaft. The gliding means may comprise rolls rolling on the guide rails or gliding shoes gliding on the guide rails when the elevator car is mowing upwards and downwards in the shaft. The guide rails may be supported with fastening brackets on the side wall structures of the shaft. The gliding means engaging with the guide rails keep the car in position in the horizontal plane when the car moves upwards and downwards in the shaft. The counter weight may be supported in a corresponding way on guide rails supported on the wall structure of the shaft. The elevator car may transport people and/or goods between the landings in the building. The shaft may be formed of solid walls and/or of open steel structures.

A drive is connected to the main network of the building and the electric motor is supplied with power from the drive. The drive may be a frequency converter. There are normally several current cut-off devices in series between the main network and the drive of the electric hoisting motor. In an elevator without a separate machine room a manually operated isolation switch and a manually operated main switch are disposed in the control cabinet of the elevator. The control cabinet of the elevator may, in an elevator without a separate machine room, be mounted in connection with or within a door frame of a landing door i.e. outside the elevator shaft. The three phase power supply cables pass from the control cabinet to the drive positioned in the shaft near the hoisting machinery. A main contactor may be provided upstream of the drive in order to provide for an automatic cut-off of the power supply to the electric motor. The control coil of the main contactor may be coupled to the elevator safety chain. An operational anomaly in the elevator that causes the elevator safety chain to open will result in an interruption of the power supply to the control coil of the main contactor. This means that the contacts of the main contactor will open, whereby the power supply to the electric motor is interrupted. The isolation switch and the main switch are large and expensive equipment. This is problematic as the control cabinet must be kept small so that it may be positioned in the frame of the landing door. The space within the control cabinet is thus rather limited. Another problem is that the power supply cables have to pass through the control cabinet.

SUMMARY

An object of the present invention is to achieve an improved current cut-off arrangement of an elevator.

The current cut-off arrangement of an elevator is defined in claim 1.

The current cut-off arrangement comprises:

a drive for driving an electric hoisting motor, a contactor having a control coil and being positioned upstream of the drive, a control circuit connecting the control coil of the contactor to a power supply, said control circuit comprising a manual control part provided with a manually operated first switch, and an electronical control part provided with an electronically operated second switch and a processor controlling the second switch, whereby the first switch and the second switch are connected in series in the control circuit with the power supply and the control coil of the contactor so that de-energization of the control coil of the contactor may be done either by the first switch or by the second switch.

According to one or more embodiments, energizing the control coil of the contactor requires that the first switch and the second switch are both in a closed state.

The contactor may be positioned in the shaft near the hoisting machinery. The first switch controlling the control coil of the contactor may on the other hand be positioned in the control cabinet. A conventional one phase small switch, which has to withstand only small currents, may be used as the first switch in the control circuit of the contactor. This means that the control cabinet may be made smaller compared to a situation in which the traditional main switch is in the control cabinet.

The control cabinet may thus be positioned far away from the drive and from the hoisting machinery of the elevator. The control cabinet may e.g. be positioned in connection with the landing door frame on a first landing of the shaft.

The power cable may pass directly from the main power supply to the drive without passing through the control cabinet. The power cable may on the other hand pass from the main power supply via the control cabinet to the drive. The latter may be desired e.g. in a three phase power supply when different electrical apparatuses receiving electric power from the control cabinet are to be connected to different phases in the power supply in order to even out the load in the different phases.

A small elevator may be provided with a one phase power supply, whereby the main contactor may be a one phase contactor. Bigger elevators are on the other hand normally provided with a three phase power supply, whereby the main contactor may be a three phase contactor.

The arrangement makes it possible to monitor the function of the main contactor and to emit an alarm signal when a problem in the function of the main contactor is detected.

A contactor positioned upstream of the drive is anyhow required to work as a self-shut-down device in fault situations. The arrangement makes it possible to realize a main switch function with a small one pole, small current force controlled first switch instead of a multi-pole, big current switch being able to cut-off the full working current of the electric motor. This reduces costs.

DRAWINGS

Figure 2:
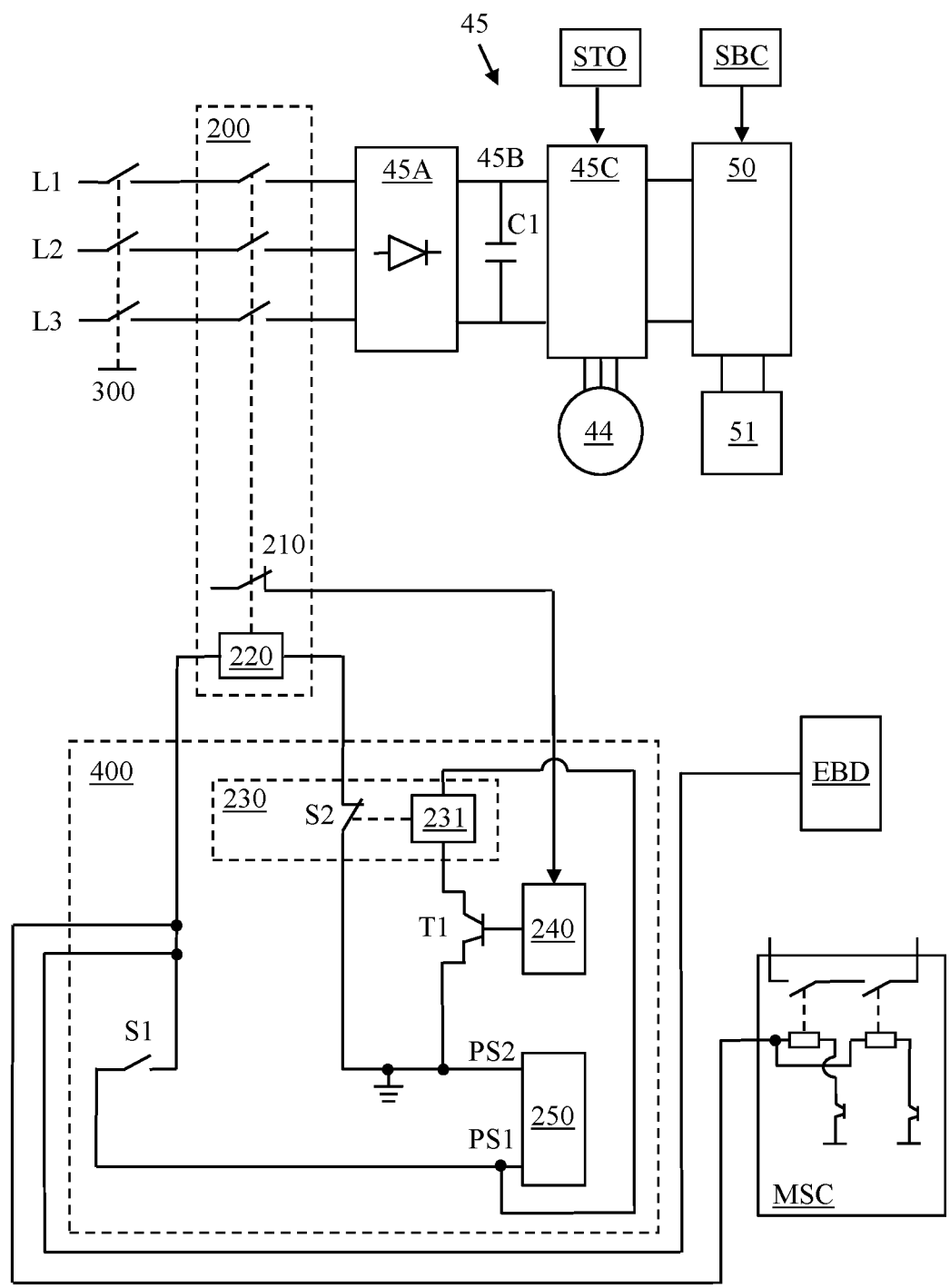

Preferred embodiments of the invention will in the following be described in greater detail with reference to the attached drawings, in which FIG. 1 shows a first vertical cross section of an elevator, FIG. 2 shows a circuit diagram of a current cut-off arrangement according to the invention.

DETAILED DESCRIPTION

FIG. 1 shows a vertical cross section of an elevator.

The elevator may comprise a car 10, a shaft 20, a machine room 30, lifting machinery 40, ropes 41, and a counter weight 42.

The lifting machinery 40 may comprise a sheave 43, a machinery brake 51, an electric motor 44, and a drive 45. The drive 45 is connected to the main network of the building and supplies electric power to the electric hoisting motor 44. The drive 45 controls the electric motor 44 and the electric motor 44 rotates the sheave 43. The drive 45 may be a frequency converter. The lifting machinery 40 may move the car 10 in a vertical direction Y1 upwards and downwards in the vertically extending elevator shaft 20. The machinery brake 46 stops the rotation of the sheave 43 and thereby the movement of the elevator car 10.

A car frame 11 may surround the car 10. The car frame 11 may be a separate frame or formed as an integral part of the car 10. The car frame 11 may be connected by the ropes 41 via the sheave 43 to the counter weight 42. The car frame 11 may further be supported with gliding means 27 at guide rails 25 extending in the vertical direction in the shaft 20. The figure shows two guide rails 25 at opposite sides of the car 10. The gliding means 27 may comprise rolls rolling on the guide rails 25 or gliding shoes gliding on the guide rails 25 when the car 10 is moving upwards and downwards in the shaft 20.

The guide rails 25 may be attached with fastening brackets 26 to the side wall structures 21 in the shaft 20. The figure shows only two fastening brackets 26, but there are several fastening brackets 26 along the height of each guide rail 25. The gliding means 27 engaging with the guide rails 25 keep the car 10 in position in the horizontal plane when the car 10 moves upwards and downwards in the shaft 20.

The counter weight 42 may be supported in a corresponding way on guide rails that are attached to the wall structure 21 of the shaft 20.

The car 10 may transport people and/or goods between the landings in the building.

The shaft 20 may be formed so that the wall structure 21 is formed of solid walls or so that the wall structure 21 is formed of an open steel structure. The shaft pit 22 is formed at the bottom of the shaft 20 below the first landing in the shaft 20.

A controller 100 may be used to control the elevator.

A travelling cable TC may pass from the car 10 to a control cabinet of the elevator. The control cabinet may be provided in the machinery area 30 in the elevator or in connection with a landing door frame on a landing. The travelling cable TC connects the car 10 and the controller 100 of the elevator.

The control cabinet may be positioned in the machine room in the elevator shown in FIG. 1. The control cabinet may on the other hand be positioned in connection with a landing or anywhere within the shaft 20 i.e. at the top of the shaft, at the middle of the shaft or at the bottom of the shaft in the shaft pit.

The use of the invention is not limited to the type of elevator disclosed in FIG. 1. The invention can be used in any type of elevator e.g. also in elevators lacking a machine room and/or a counterweight. The counterweight could be positioned on either side wall or on both side walls or on the back wall of the elevator shaft. The sheave, the machine brake, the motor, and the drive could instead of the machine room be positioned anywhere within the shaft i.e. at the top of the shaft, at the middle of the shaft or at the bottom of the shaft in the shaft pit.

An elevator lacking a machine room 30 may be provided with a Maintenance Access Panel (MAP) positioned in a door frame on a landing e.g. on the uppermost landing. The controller 100 is thus positioned in the MAP. The travelling cable TC will thus pass from the car 10 to the MAP.

FIG. 2 shows a circuit diagram of an arrangement according to the invention.

The figure shows a three phase power supply from the main supply L1, L2, L3 via a manual isolation switch 300 and further via a contactor 200 to the an input of the drive 45 and further from an output of the drive 45 to the electric hoisting motor 44. The drive 45 may be a frequency converter comprising a rectifier 45A, an intermediate circuit 45B and an inverter 45C. The rectifier 45A converts the three phase L1, L2, L3 AC electric voltage into a DC electric voltage in the intermediate circuit 45B. The capacitor C1 in the intermediate circuit 45B smooths the DC electric voltage. The inverter 45C converts the DC electric voltage provided in the intermediate circuit 45B into a controlled three phase AC electric voltage to be supplied to the electric motor 44. A brake controller 50 controls an electromagnetic machinery brake 51. The power supply to the brake controller 50 is in the form of DC voltage from the intermediate circuit 45B of the drive 45. An electronic safety logic comprising a Safety Torque Off (STO) logic being able to interrupt the current supply to electric motor 44 and a Safety Brake Control (SBC) logic being able to close the hoisting machinery brakes may further be provided in the elevator. The power supply to the brake controller 50 may instead be taken upstream of the drive 45 from the AC supply. A separate rectifier is then needed to supply the brake controller 50 with DC voltage. Electric power could also be supplied from the electric motor 44 to the power supply in case the motor is braking and works as a generator.

This inventive arrangement combines the manual main switch and the main contactor into a single current cut-off device i.e. into a combined main switch. The combined main switch comprises a contactor 200 being controlled with a (low-current) control circuit 400 comprising a manual control part and an electronic control part. The manual control part and the electronic control part control the opening and the closing of the contactor 200. The manual control part and the electronic control part are connected in series with the control coil 220 of the contactor 200. This means that de-energization of the control coil 220 of the contactor 200 may be done either by the manual control part or by the electronic control part. Energizing the control coil 220 of the contactor 200 requires that a manually controlled switch in the manual control part and an electronically controlled switch in the electronic control part is in a closed state.

The contactor 200 itself may be disposed in the elevator shaft 20. The contactor 200 may be positioned inside the drive unit 45 or in the vicinity of the drive unit 45.

The manual control part may comprise a low-current and small-sized manually operated first switch S1. The first switch S1 may be disposed in the control cabinet outside the shaft 20.

The electronic control part may comprise an electronically operated second switch S2, which may be controlled by a processor 240 e.g. the microprocessor of the drive 45.

The contactor 200 may be opened and/or closed with the first switch S1 and with the second switch S2 being controlled with the processor 240. The second switch S2 may be a contact of a relay 230.

A main portion of the control circuit 400 connects the control coil 220 of the contactor 200 to a power supply 250. One end of the control coil 220 of the contactor 200 is connected via the first switch S1 to a first output PS1 of the voltage supply 250. The other end of the control coil 220 of the contactor 200 is connected via the second switch S2 i.e. a NC (Normally Closed) contact of the relay 230 to a second output PS2 of the voltage supply 250.

A sub portion of the control circuit 400 connects the control coil 231 of the relay 230 to the power supply 250. One end of the control coil 231 of the relay 230 is connected to the first input PS1 of the voltage supply 250. The other end of the control coil 231 of the relay 230 is connected via a power transistor T1 to the second output PS2 of the voltage supply 250. The processor 240 controls the power transistor T1 and the power transistor T1 controls the control coil 231 of the relay 230.

The voltage supply 250 may be a DC voltage supply e.g. a 24 V DC voltage supply.

The electronic control part may be positioned inside the drive 45.

The advantage with this arrangement is that only a small-sized first switch S1 is positioned in the control cabinet. This means that the control cabinet can be made smaller. This is a benefit especially in elevators with no separate machine room. It is easier to fit a small control cabinet into the landing door frame. The cables of the three phase electric power supply do not pass through the control cabinet in this solution.

The isolating device 300 is still needed in the same way as in prior art solutions. The isolation device 300 does not, however, have to be positioned in the control cabinet in this novel arrangement. The isolation device 300 may instead be positioned in the shaft 20 in the vicinity of the contactor 200 so that the contactor 200 can be easily de-energized for maintenance purposes by opening the isolation device 300.

The use of the combined main switch 200 makes it possible to further increase the safety of the elevator as will be described hereinafter.

A traditional safety chain is not necessary needed in an elevator provided with the combined main switch 220. The drive 45 may instead be provided with an electronic safety logic. The electronic safety logic may comprise a portion e.g. a Safe Torque Off (STO) logic, which is able to interrupt the current supply to electric motor 44 and a portion e.g. a Safe Brake Control (SBC) logic, which is able to close the hoisting machinery brakes in a highly reliable manner.

WO publication 2013/178874 discloses on example of such an electronic safety logic, which can be used in an elevator provided with the novel combined main switch 200. The term "drive prevention logic" is used for the STO logic and the term "brake drop-out logic" is used for the SBC logic in the WO publication. This electronic safety logic may be controlled by an elevator safety controller MSC, which sends a safety signal to the electronic safety logic when the elevator is in a safe state. Detection of an operational anomaly in the elevator results in that the elevator safety controller MSC disconnects the safety signal. Disconnection of the safety signal results in that the STO logic interrupts the supply of electric power to the electric motor 44 and the SBC logic closes the hoisting machinery brakes 51, whereby rotation of the hoisting machinery is prevented.

The elevator may also be provided with an Emergency Battery Drive (EBD) unit. The control circuit of the combined main switch 220 sends a control signal to the EBD unit in order to disable emergency battery drive when the manual switch S1 has opened the contactor 200. This means that high voltage cannot be provided from the battery of the EBD unit to the drive 44 when a service technician has opened the combined main switch 200 in order to repair the drive 45. The risk that the service technician would be subject to an electric shock is thus avoided. A point between the main switch S1 and the control coil 220 of the contactor 200 in the control circuit may be connected to an input in the EBD unit as seen in the figure.

The electronic control part measures also the motor current (which is not shown in the figure). This may be done by using the current sensors of the drive 45. When the elevator car 10 stops, the electronic control part monitors that the STO logic operates correctly, i.e. interrupts the electric power supply to the electric motor 44. If the electronic control part detects that the STO logic does not interrupt the electric power supply to the electric motor 44 as required, then the electronic control part controls the contactor 200 to open in order to disable elevator operation. This function improves elevator safety and is basically used to fulfil elevator safety codes.

Further, when the drive direction of the elevator changes, e.g. in a situation in which the next start is in an opposite direction compared to the previous one, the electronic control part controls the contactor 200 to open and verifies that the motor current decreases to zero in order to test that the contactor 200 operates correctly. This function is also used to fulfil a specific safety requirement of elevator.

The elevator safety controller MSC also monitors the operating condition of the contactor 200. The contactor 200 is provided with an auxiliary NC (normally closed) contact 210, which is used as a feedback channel to monitor the operational status of the contactor 200. This feedback signal may be directed to the processor 240 of the electronic control part, which sends said feedback signal further to the MSC through a specific data bus (safety bus). The feedback signal may as an alternative be directed directly to the MSC.

The MSC receives at the same time also a status signal indicating the operating status of the manual control part i.e. a so called M1-signal. A point between the first switch S1 and the control coil 220 of the contactor 200 in the control circuit is connected to an input in the safety controller MSC as seen in the figure.

The MSC may compare the status of the contactor 200 based on the signal received from the auxiliary contact 210 with the status of the first switch S1 based on the received M1-signal in order to monitor whether the status of the contactor 200 corresponds to the status of the first switch S1. If there is a discrepancy between said two statuses, then the MSC determines that the contactor 200 is faulty and sends an alarm to the maintenance center.

The M1-signal is also used in the MSC to prevent driving of the elevator in a situation where a service technician has opened the first switch S1 in the manual control part in order to open the contactor 200, but it is still possible to drive the elevator from the battery of the emergency battery drive EBD unit. In this case the MSC cuts off the safety signal to make sure that the STO logic and the SBC logic block driving of elevator. Control of the STO logic and of the SBC logic with the MSC also ensures that the elevator stops reliably in a situation where the elevator motor 44 is regenerating i.e. working as a generator and a service technician opens the manual switch S1 in the manual control part in order to stop the elevator.

The electronic control part may also be used as an earth fault and ground leakage current detection device. The processor 240 may measure the motor currents and if the sum of the motor currents deviates a certain amount from zero, then the processor 240 indicates a fault situation and the electronic control part opens the contactor 200.

The figures shows a three phase contactor 200, which may be used in bigger three phase elevators. A one phase contactor 200 may on the other hand be used in small one phase elevators. The inventive arrangement may be used in connection with a contactor 200 comprising at least one pole e.g. a one phase contactor and a three phase contactor.

It will be obvious to a person skilled in the art that, as the technology advances, the inventive concept can be implemented in various ways. The invention and its embodiments are not limited to the examples described above but may vary within the scope of the claims.

The invention claimed is:

1. A current cut-off arrangement of an elevator comprises:
    a drive for driving an electric hoisting motor,
    a contactor having a control coil and being positioned upstream of the drive,
    a control circuit connecting the control coil of the contactor to a power supply, said control circuit comprising a manual control part provided with a manually operated first switch, and an electronical control part provided with an electronically operated second switch and a processor controlling the second switch, whereby the first switch and the second switch are connected in series in the control circuit with the power supply and the control coil of the contactor so that de-energization of the control coil of the contactor may be done either by the first switch or by the second switch,
    whereby the elevator further comprises an electronic safety logic comprising a Safe Torque Off logic (STO logic) used to interrupt current supply to the electric hoisting motor and a Safe Brake Control logic (SBC logic) used to close hoisting machinery brakes in a reliable manner.

2. The arrangement according to claim 1, whereby the contactor comprises an auxiliary contact, the status of the auxiliary contact being used as a feed-back signal indicating the status of the contactor.

3. The arrangement according to claim 1, whereby the second switch is a contact of a relay, the relay being controlled by the processor.

4. The arrangement according to claim 3, whereby a power transistor is connected in series with a control coil of the relay, an output of the processor controlling the power transistor and thereby the relay.

5. The arrangement according to claim 1, whereby the elevator further comprises an Emergency Battery Drive (EBD) unit, a point in the control circuit between the first switch and the control coil of the contactor being connected to an input in the EBD unit in order to transfer the status information of the first switch to the EBD unit, the EBD unit being disabled when the status information of the first switch indicates that the first switch has opened the contactor.

6. The arrangement according to claim 1, whereby the elevator further comprises an elevator safety controller, a point in the control circuit between the first switch and the control coil of the contactor being connected to an input in an MSC in order to transfer the status information of the manual switch to the MSC.

7. The arrangement according to claim 1, whereby an auxiliary contact of the contactor is connected to an input in an elevator safety controller in order to transfer a feed-back signal indicating the status of the contactor to an MSC.

8. The arrangement according to claim 6, whereby the elevator safety controller compares the status of the contactor and the status of the first switch in order to monitor that the status of the contactor follows the status of the first switch.

9. The arrangement according to claim 2, whereby the second switch is a contact of a relay, the relay being controlled by the processor.

10. The arrangement according to claim 2, whereby the elevator further comprises an electronic safety logic comprising a Safe Torque Off logic (STO logic) used to interrupt current supply to the electric hoisting motor and a Safe Brake Control logic (SBC logic) used to close hoisting machinery brakes in a reliable manner.

11. The arrangement according to claim 3, whereby the elevator further comprises an electronic safety logic comprising a Safe Torque Off logic (STO logic) used to interrupt current supply to the electric hoisting motor and a Safe Brake Control logic (SBC logic) used to close hoisting machinery brakes in a reliable manner.

12. The arrangement according to claim 4, whereby the elevator further comprises an electronic safety logic comprising a Safe Torque Off logic (STO logic) used to interrupt current supply to the electric hoisting motor and a Safe Brake Control logic (SBC logic) used to close hoisting machinery brakes in a reliable manner.

13. The arrangement according to claim 2, whereby the elevator further comprises an Emergency Battery Drive (EBD) unit, a point in the control circuit between the first switch and the control coil of the contactor being connected to an input in the EBD unit in order to transfer the status information of the first switch to the EBD unit, the EBD unit being disabled when the status information of the first switch indicates that the first switch has opened the contactor.

14. The arrangement according to claim 3, whereby the elevator further comprises an Emergency Battery Drive (EBD) unit, a point in the control circuit between the first switch and the control coil of the contactor being connected to an input in the EBD unit in order to transfer the status information of the first switch to the EBD unit, the EBD unit being disabled when the status information of the first switch indicates that the first switch has opened the contactor.

15. The arrangement according to claim 4, whereby the elevator further comprises an Emergency Battery Drive (EBD) unit, a point in the control circuit between the first switch and the control coil of the contactor being connected to an input in the EBD unit in order to transfer the status information of the first switch to the EBD unit, the EBD unit being disabled when the status information of the first switch indicates that the first switch has opened the contactor.

16. The arrangement according to claim 1, whereby the elevator further comprises an Emergency Battery Drive (EBD) unit, a point in the control circuit between the first switch and the control coil of the contactor being connected to an input in the EBD unit in order to transfer the status information of the first switch to the EBD unit, the EBD unit being disabled when the status information of the first switch indicates that the first switch has opened the contactor.

17. The arrangement according to claim 2, whereby the elevator further comprises an elevator safety controller, a point in the control circuit between the first switch and the control coil of the contactor being connected to an input in an MSC in order to transfer the status information of the manual switch to the MSC.

18. The arrangement according to claim 3, whereby the elevator further comprises an elevator safety controller, a point in the control circuit between the first switch and the control coil of the contactor being connected to an input in an MSC in order to transfer the status information of the manual switch to the MSC.

19. The arrangement according to claim 4, whereby the elevator further comprises an elevator safety controller, a point in the control circuit between the first switch and the control coil of the contactor being connected to an input in an MSC in order to transfer the status information of the manual switch to the MSC.

* * * * *